United States Patent [19]
Hayakawa

[11] Patent Number: 5,897,791
[45] Date of Patent: Apr. 27, 1999

[54] WIRE-CUT ELECTRICAL DISCHARGE MACHINE

[75] Inventor: Jun Hayakawa, Ishikawa, Japan

[73] Assignee: Sodick Co., Ltd., Japan

[21] Appl. No.: 08/776,031

[22] PCT Filed: May 31, 1996

[86] PCT No.: PCT/JP96/01483

§ 371 Date: Jan. 23, 1997

§ 102(e) Date: Jan. 23, 1997

[87] PCT Pub. No.: WO96/38252

PCT Pub. Date: Dec. 5, 1996

[30] Foreign Application Priority Data

Jun. 1, 1995 [JP] Japan ................................ 7-156726

[51] Int. Cl.⁶ .............................. B23H 1/00; B23H 7/02
[52] U.S. Cl. ..................................... 219/69.12; 219/69.11
[58] Field of Search ............................. 219/69.11, 69.12, 219/69.14

[56] References Cited

U.S. PATENT DOCUMENTS 4,608,143  8/1986  Inoue ................................. 219/69.12

FOREIGN PATENT DOCUMENTS

96920023   4/1996   European Pat. Off. .
63-306829  12/1988  Japan .
64-40216    2/1989  Japan .
4-25092     4/1992  Japan .
4-164517    6/1992  Japan .
8-118155    5/1996  Japan .
WO96/38252 12/1996  Japan .

Primary Examiner—Geoffrey S. Evans
Attorney, Agent, or Firm—McDermott, Will & Emery

[57] ABSTRACT

A wire-cut electrical discharge machine for machining a workpiece using a wire electrode tensioned between a first and second wire guide, in a state where the gap between the wire electrode and the workpiece is filled with a machining fluid, is provided with a work tank (WT) which holds the workpiece (WP), a guide mechanism (N) which guides the movement of a first wire guide (14) in an X-Y plane formed by mutually perpendicular X and Y axes arrayed within the work tank, and a sealing member (16) which covers the guide mechanism (N) and blocks against leakage of machining fluid from the work tank (WT); the sealing member (16) is connected to a pressurized fluid supply device (401, 402, 403, A1, A2) for the purpose of supplying a pressurized fluid therein, and the pressurized fluid supply device responds to a signal from a sensor (404) mounted on the sealing member (16) which detects fluid pressure, thus regulating the pressure inside the sealing member to be the same as the external fluid pressure of the pressurized machining fluid.

14 Claims, 9 Drawing Sheets

FIG. 10

WIRE-CUT ELECTRICAL DISCHARGE MACHINE

TECHNICAL FIELD

The present invention relates to an electrical discharge machine, and more particularly, to a wire-cut electrical discharge machine in which a workpiece may be machined by wire-cut discharge either with the workpiece submerged in the machining fluid in a work tank, or with machining gaps filled with machining fluid.

BACKGROUND TECHNOLOGY

Generally, in a wire-cut electrical discharge machine, a pair of upper and lower wire guides is used to tension the wire electrode, with the lower wire guide positioned below the workpiece. Discharge energy is applied to the wire electrode while supplying machining fluid to the gap formed by the workpiece and the wire electrode, thus wire-cut discharge machining the workpiece. Such wire-cut electrical discharge machines include, for example, the "submersion-type" wire-cut electrical discharge machines, in which wire-cut electrical discharge machining can be performed with the workpiece submerged in the machining fluid within a work tank. In this type of wire-cut electrical discharge machine, when performing electrical discharge machining on a workpiece submerged in the machining fluid within a work tank, the movement of the lower arm which supports the lower wire guide is limited by the side wall of the work tank. As a result, the range of movement of the lower wire guide becomes extremely narrow, and the dimensions of the machinable workpiece with respect to the dimensions of the work tank are reduced, requiring tanks which are quite large in comparison to the size of the machinable workpiece. This is the primary factor preventing the size reduction of wire-cut electrical discharge machines. The same problem arises when wire-cut electrical discharge machining the workpiece either while directly flushing the machining gap with machining fluid or while submerging the gap in machining fluid. A wire-cut electrical discharge machine amenable to size reduction is proposed as a solution to the above described problems in Japan Laid Open Patent Publication 60-52223, whereby a mechanism is provided to enable the movement of the lower arm along the long walls of the work tank while permitting the lower arm to penetrate the work tank side wall. In a wire-cut electrical discharge machine of the above-described configuration, in which the lower arm penetrates one of the work tank side walls, the difference between the work tank dimensions and the maximum machinable workpiece dimensions can be reduced. However, absolutely smooth movement of the lower arm is hindered by the sealing device placed between the lower arm and the work tank side wall, which is used to prevent leakage of machining fluid. The sealing device tends to apply a lateral force due to the movement of the lower arm with respect to it, producing the problem of reduced machining accuracy. Also, in that type of sealing mechanism, the sealing member can easily become degraded by the rubbing effect associated with lower arm movement, requiring frequent maintenance and inspection, creating a separate problem of new costs associated with the maintenance and inspection needed to maintain a given performance over time.

DISCLOSURE OF THE INVENTION

An object of the present invention is to provide an improved wire-cut discharge machine of the type described above, whereby the difference in work tank size and maximum machinable workpiece size can be reduced, and wide angle tapering can be performed, without reducing machining accuracy and without incurring large costs for maintenance and inspection.

A wire-cut electrical discharge machine according to the present invention is provided wherein a workpiece may be wire-cut machined using a wire electrode tensioned between first and second wire guides, and wherein the gap between the wire electrode and the workpiece is filled with machining fluid. The machine includes a work tank, in which the workpiece is held, a guide mechanism positioned in the work tank, which guides the movement of the first wire guide on an X-Y plane formed by mutually perpendicular X and Y axes, and a sealing member which covers the guide mechanism and blocks the entry of machining fluid supplied to the work tank. Preferably, the guide mechanism is provided with a movable part to which the first wire guide is attached, a movable guide which guides the movement of the movable part along either the X or the Y axis, and the first and second guides, which guide the movable guide along the other axis, and which are positioned at the bottom of the work tank so as to oppose one another with respect to the wire guides. The guide mechanisms, except for the first wire guide, are all covered by bellows, in order to prevent penetration by the machining fluid stored in the work tank. Furthermore, a pressurized fluid supply device is connected to the inside of those bellows in order to supply pressurized fluid. By this means, the first wire guide device attached to the movable guide can allow the machinable dimension within the work tank to be maximized, such that guiding is effected without interfering with free movement within the X-Y plane.

PREFERRED FORM OF THE INVENTION

Figure 1:
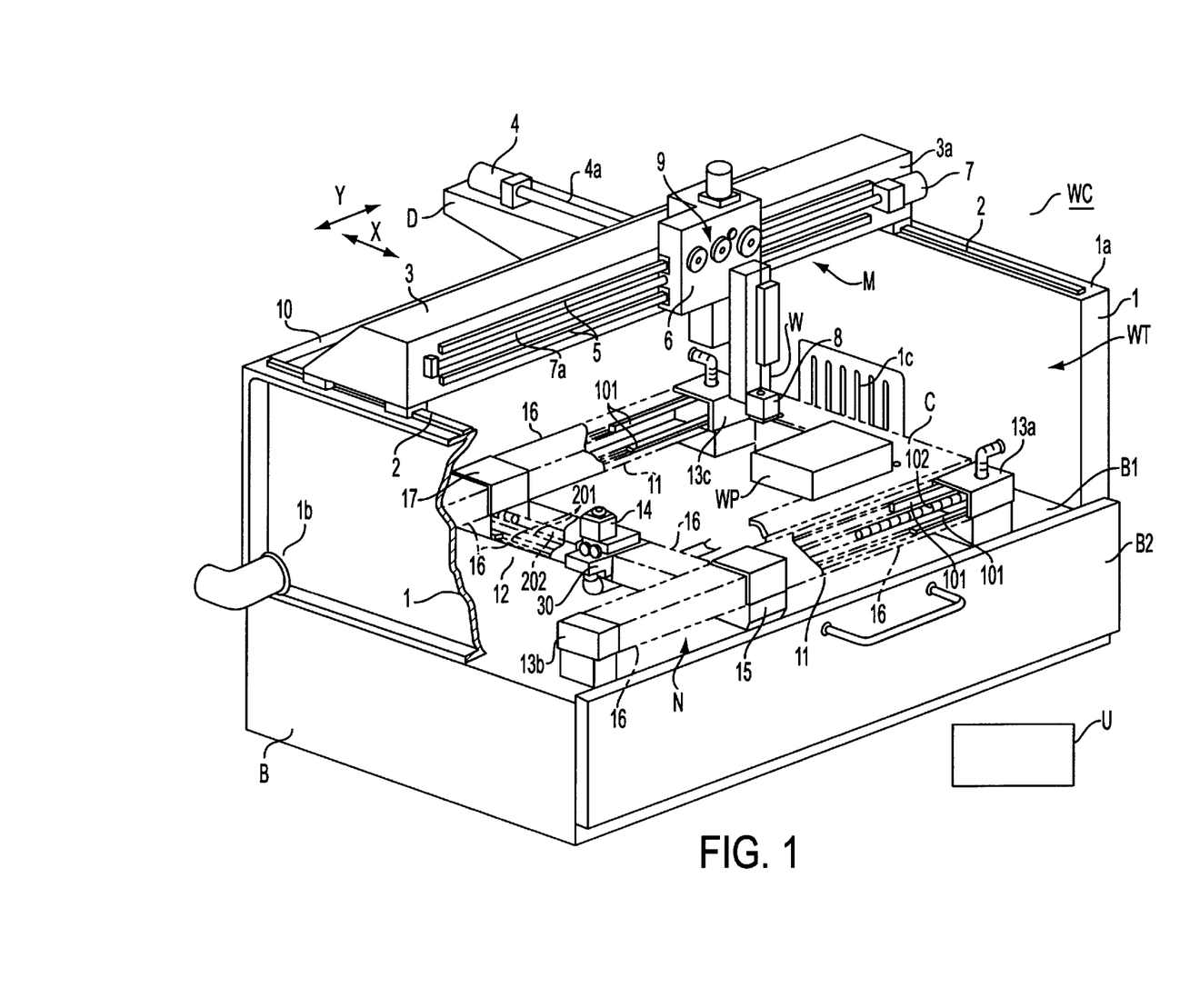
FIG. 1 is a perspective view showing a partial section of an embodiment of the present invention.

FIG. 1 is a perspective view showing a partial section of an embodiment of the wire-cut electrical discharge machining device WC of the present invention. Below the constituent parts illustrated in FIG. 1 are explained. Part B is a bed; part C is a work stand affixed to the bottom portion B1, which is formed by a side wall 1 of a work tank WT and bed B. A workpiece WP is attached to the work stand C by appropriate known means.

In order to machine the workpiece by wire-cut electrical discharge, a bottom portion B1 is formed by the side wall 1 of the work tank WT and the bed B. The work tank WT has an opening on the front side for loading and unloading the workpiece, the opening being fitted with a door B2 capable of closing off the opening. A sealing part, not shown, is interposed between the work tank WT and the bottom portion B1, and in the area where the door B2 contacts the side wall 1. By this means, a fluid-tight seal is maintained between the two, such that machining fluid can be stored in the work tank WT. As can be seen from FIG. 1, by storing the machining fluid in the work tank WT, the workpiece attached to the work stand C can be submerged in the machining fluid. In other words, in the invention the workpiece can be wire-cut electrical discharge machined using an appropriate machining fluid with the workpiece submerged in the machining fluid. With respect to supply and outflow of the machining fluid, an inflow port 1c and an outflow port 1b connecting to the work tank WT are provided. By connecting the inflow port 1c and the outflow port 1b to a known machining fluid supply device, not shown, a machining fluid circulation path is formed, enabling the supply and removal of machining fluid. Also, although not shown, a device for controlling the level of the machining fluid in the work tank is also provided.

Figure 2:
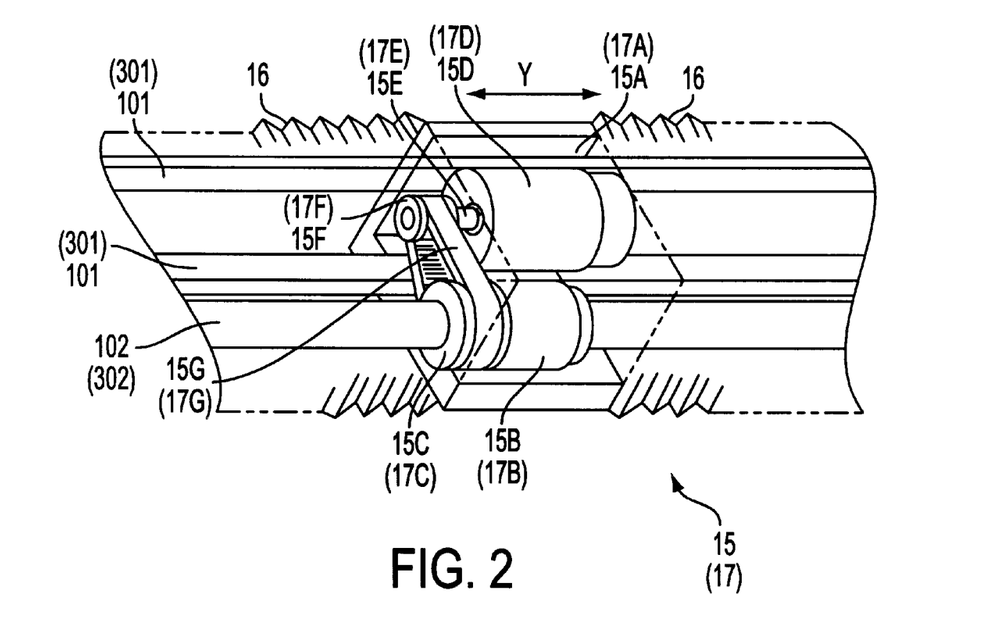
FIG. 2 is a perspective view showing a partial section of the movable guide motion device shown in FIG. 1.

An upper wire guide device 8 and a lower wire guide device 14 are provided in order to perform wire-cut electrical discharge machining of a workpiece thus submerged in the machining fluid. The lower wire guide device 14 is attached to the guide mechanism N. By means of the guide mechanism N, the lower wire guide device 14 can be moved relative to the workpiece within a specified horizontal plane on the lower side of the workpiece WP. The upper wire guide 8 is attached to a movement mechanism M. This enables the upper wire guide device 8 to be moved relative to the workpiece WP within a specified horizontal plane above the workpiece. A wire electrode W is tensioned between the lower wire guide device 14 and the upper wire guide device 8. The movement mechanism M is equipped with a beam part 3, which moves along the X axis (U axis), guided by the guide rails 2 placed on the top edges 1a of the opposing side wall materials 1 of the work tank WT. A motor 4 is placed on a bracket D, which is affixed to the back side 10 of the work tank WT; a drive screw 4a, which engages the beam part 3, is linked to a rotating axle (not shown) of a motor 4. Therefore by controlling the rotation of the motor 4, the beam part 3 is caused to move along the guide rails 2, thus positioning the wire guide device 8 at a desired position in the X direction. A pair of mutually parallel guide rails 5 are aligned with the Y axis (V axis) direction on the vertical face 3a of the beam part 3. A machining head 6 is guided by the guide rails 5, 5. The machining head 6 engages a feed screw 7a, which is rotationally driven by a motor 7 mounted on the beam part 3, which is positioned in parallel with the guide rails 5, 5. The machining head 6 is caused to move along the guide rails 5, 5 by controlling the rotation of the motor 7, thus enabling the wire guide to be positioned at a desired Y-direction location. A wire electrode supply mechanism 9 is provided on the machining head 6 in order to supply the wire electrode W to the upper guide device 8. The structure of this wire electrode supply mechanism 9 is generally known, and an explanation thereof is thus omitted. As can be understood from the preceding description, by controlling the rotation of the motors 4 and 7, it is possible to move the beam part 3 in the X direction and to move the machining head 6 mounted on the beam part 3 in the Y direction, thus making it possible to position the upper wire guide device 8 affixed to the lower end of the machining head 6 to a desired location within a specified X-Y plane over the workpiece. A drive device is provided in the machining head for moving the upper wire guide device 8 in the Z direction (only the motor is shown in the diagram). The guide mechanism N includes a pair of guides 11 which are arrayed in the Y direction so as to be parallel with the bottom section B1 of the work tank WT. In the present embodiment, these guides 11 are supported by a pair of support posts 13a and 13b affixed to the bottom section B1, and a separate pair of support posts 13c and 13d so as to be mutually parallel, with a space between them and bottom section B1. In FIG. 1, only the support posts 13a, 13b, and 13c are visible. One of the guides 11 will now be explained. The guide 11 comprises a pair of guide rails 101 and a feed screw 102, positioned between the support posts 13a and 13b and extending parallel to each other such that both are parallel to the Y direction. The ends of the guide rails 101 and the feed screw 102 are strongly secured to the support posts 13a and 13b. Except for the fact that there is no need for a corresponding feed screw 102, the structure of the other guide 11 is the same as the guide 11 described above. A movable guide motion device 15 is provided on one of the pairs of guides 11 in order to move a movable guide 12 in the Y direction, which will be described in detail below. The movable guide motion device 15, as shown in FIG. 2, is equipped with a casing 15A mounted on the guide rails 101 for free movement in the Y direction, and a feed nut 15B, which is contained within the casing 15A, is held in place by a support part as a freely rotating bearing which is pushed inward. The feed nut 15B threadingly engages the feed screw 102; the pulley 15C through which the feed screw 102 freely extends is affixed to the feed nut 15B. A pulley 15F is affixed to an output shaft 15E of a motor 15D fastened to the casing 15A, and the pulley 15F is linked so as to operate with the pulley 15C by means of a ribbed belt 15G. Thus, the feed nut 15B is rotationally driven by the output shaft 15E of the motor 15D output shaft 15E, causing movement of the casing 15A in the Y direction along the guide rails 101, thus enabling positioning at the desired location. In order to seal the aforementioned guides 11 from the machining fluid, a set of bellows 16, made of a suitable waterproof material, are respectively placed between the movable guide motion device 15 and the support posts 13a and 13b. The guide rails 101, the feed screw 102, and the internal mechanism of the movable guide motion device 15 can thus be sealed off from machining fluid without impeding the specified movement of the movable guide motion device 15. A movable part 17, which is equivalent to the movable guide motion device 15 described above, is provided on the other guide 11. The movable part 17 has substantially the same structure as the movable guide motion device 15. In order for the movable part 17 to be guidable by the guide rails 301 and move in the axial direction thereof, which is to say the Y direction, a casing 17A is attached to the guide rails 301. As an even more preferable embodiment, a motor 17B, a feed nut 17B, a feed screw 302, a pulley 17C, an output shaft 17E, a pulley 17F, and a ribbed belt 17G can all be added to the above-described movable part 17. That is, it is sufficient to provide a drive system able to move at least one of the casings of the two guides (11). The reference numerals in parentheses for the parts matching each of the portions of FIG. 2 correspond to this structure, so a detailed explanation thereof is omitted. Bellows 16, made of an appropriate waterproof material, are provided in the spaces between the movable part 17 and the support posts 13c and 13d; by this means the guide 11 is sealed from the machining fluid. Therefore in this case as well, the movable part 17 can be guided so that it moves freely in the Y direction by the guide rails 301, and the interior of the guide 11 is sealed from the machining fluid without impeding movement of the movable part 17. A movable guide 12 links the movable guide motion device 15 and the movable part 17 and is axially aligned in the X direction. By the movement of the movable guide motion device 15 along the corresponding guide 11 with the rotation of the motor 15D in the movable guide motion device 15, the movable guide 12 can be moved in the Y direction. Preferably, the movable guide 12 can be moved by the joint working of the motors 15D and 17D.

Figure 3:
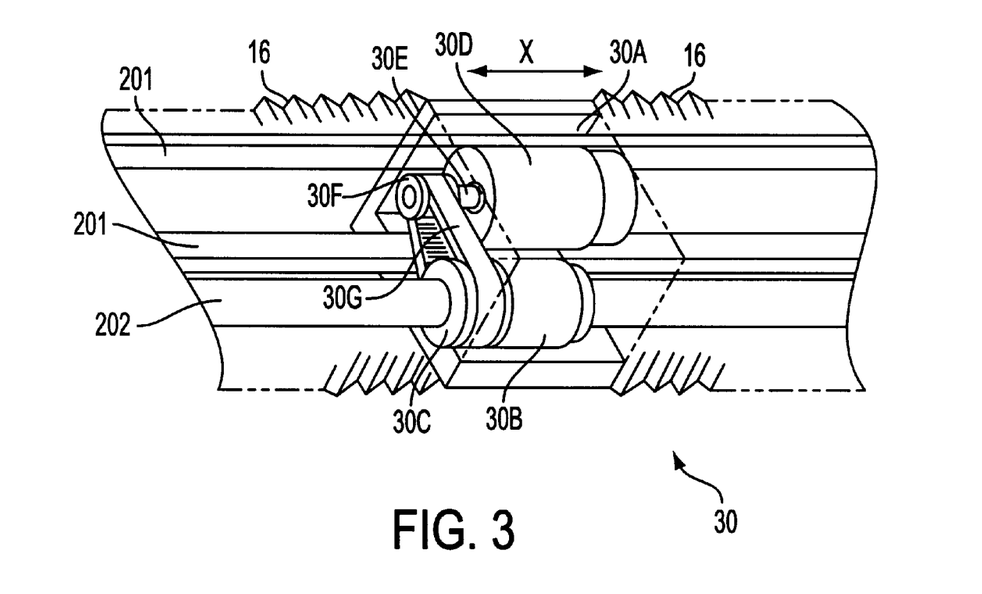
FIG. 3 is a perspective view showing a partial section of another movable guide motion device shown in FIG. 1.

Next, with reference to FIG. 39 the structure of the movable guide will now be described. The movable guide 12 has a similar structure to the movable guide motion device 15 and the movable part 17 described above. A pair of guide rails 201 and a feed screw 202 which extends parallel to them, are connected the casing 15A of the movable guide motion device 15 at one end, and are connected to the casing 17A of the movable part 17 at the other end. A lower wire guide motion device 30 is mounted to the guide rails 201 and the feed screw 202 so as to be operable therewith. As shown in FIG. 3, the lower wire guide motion device 30 is mounted in the same way as the movable guide motion device 15 shown in FIG. 2, so as to be operable with respect to the guide rails 201 and the feed screw 202, and is sealed from machining fluid by the bellows 16. The 30-series reference numerals are used here to indicate portions of the guide motion device 30 which correspond to the parts explained above with reference to FIG. 2; a separate explanation thereof is omitted.

The lower wire guide device 14 is mounted to the lower wire guide motion device 30, and the lower wire guide motion device 30 moves along the movable guide 12, which is to say in the X direction, thus making it possible to move the lower wire guide device 14 in the X direction for positioning. In this manner, the internal mechanism of the drive device N is kept watertight by multiple bellows 16.

Figure 6:
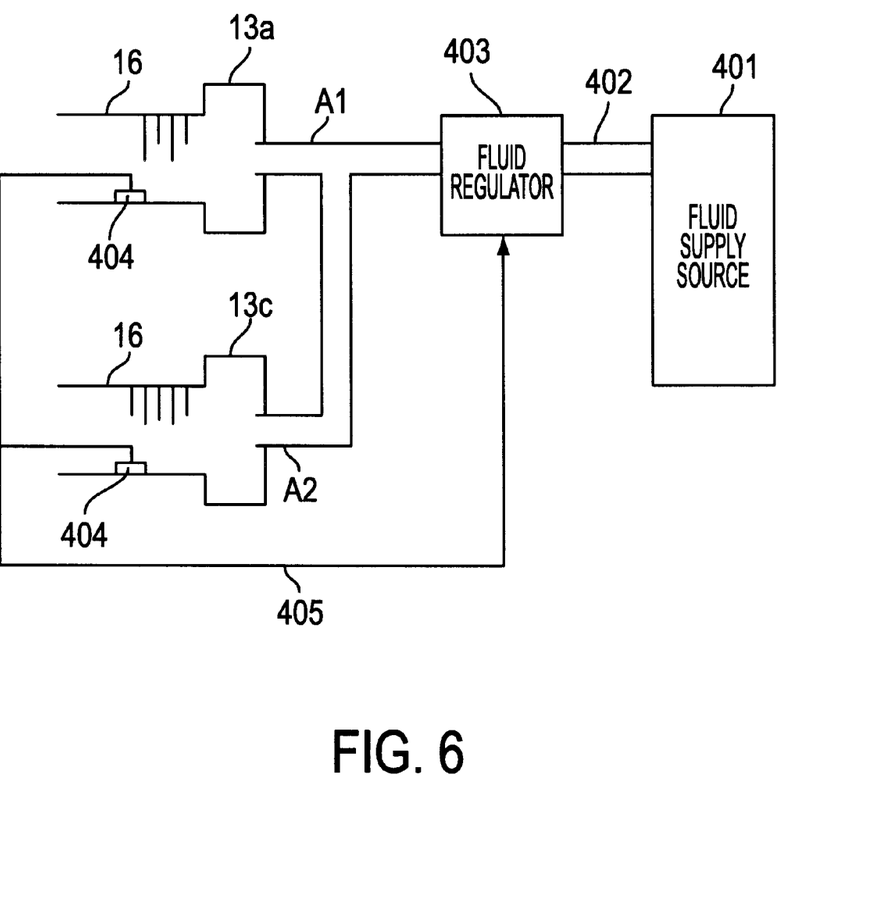
FIG. 6 is a structural diagram of the pressurized fluid supply system for the wire-cut electrical discharge machine shown in FIG. 1.

In order to reliably prevent the invasion of machining fluid into the bellows 16 when machining fluid is introduced into the work tank WT, a pressurized fluid is supplied via pressurized fluid supply pipes A1 and A2 to the inside of the bellows 16 from a pressurized fluid supply source, which is preferably separate from the wire-cut electrical discharge machine WC. FIG. 6 shows the structure of the pressurized fluid supply system used in FIG. 1. In FIG. 6, a pressurized fluid supply source 401 is shown in the illustrated embodiment, and dried air is supplied under pressure. The pressurized air from pressurized fluid supply source 401 is fed to a fluid regulator 403 through a pipe 402. Here the air pressure is adjusted so that it is roughly the same or slightly higher than the fluid pressure of the machining fluid stored in work tank 1. Pressure-adjusted air is supplied to the support post 13a through pressurized fluid supply pipe A1. The support post 13a is in fluid communication with to the interior of the corresponding attached bellows 16 so that, by means of the air thus fed in, the internal pressure in the bellows 16 is brought to a value which is equal to or slightly higher than the external fluid pressure. Pressure-adjusted air is also fed into the support post 13c through the pressurized fluid supply pipe A2, thus making it possible to bring the internal pressure of the corresponding bellows to a value which is equal to or slightly higher than the external fluid pressure. The connection between the pressurized fluid supply pipes A1 and A2 and the support posts 13a and 13b is an air seal connection of appropriate means so that there is no air leakage. By supplying the pressurized fluid to the inside of the bellows 16 in this manner, any invasion of machining fluid into the bellows can be reliably prevented in cases where a hole opens in the bellows 16, since the pressurized fluid will simply be exhausted into the machining fluid. The same is true for cases in which the condition of the seal becomes degraded. In these cases, air rises in bubbles from a hole(s) in the bellows 16 or the connecting portion, so that operators will be able to quickly discover that damage has occurred to the bellows 16 or the seal, which is favorable from a maintenance standpoint. Also, by pressurizing the interior of the bellows 16, distortion of the bellows 16 due to fluid pressure from the pressure of the machining fluid can be effectively prevented, as can disturbance of the action of the guide mechanism N by the bellows 16. Dry air is preferable as the pressurized fluid. Lubricating oil could, for example, also be used. By using lubricating oil, sealing problems caused by the bellows 16 can be quickly discovered, as described above, while the buoyancy caused by the machining fluid when using air is also reduced.

The fluid pressure on the bellows 16 changes, although very slightly, with the height of the machining fluid surface, so this structure is one in which a sensor 404 mounted on the bellows 16 detects this fluid pressure, and pressure in the fluid pressure regulator 403 is controlled in response to a detection signal 405, making it possible to supply pressurized fluid to the interior of the bellows 16.

As can be understood from the above explanation, the lower wire guide device 14 is caused by the guide mechanism N to move within a specified X-Y plane in the work tank WT, thus enabling positioning at a desired location. Needless to say, the X-Y horizontal plane in which the lower wire guide device 14 moves is on the underside of the workpiece. Next, the movement of the wire-cut electrical discharge machine WC shown in FIG. 1 is explained.

Figure 4:
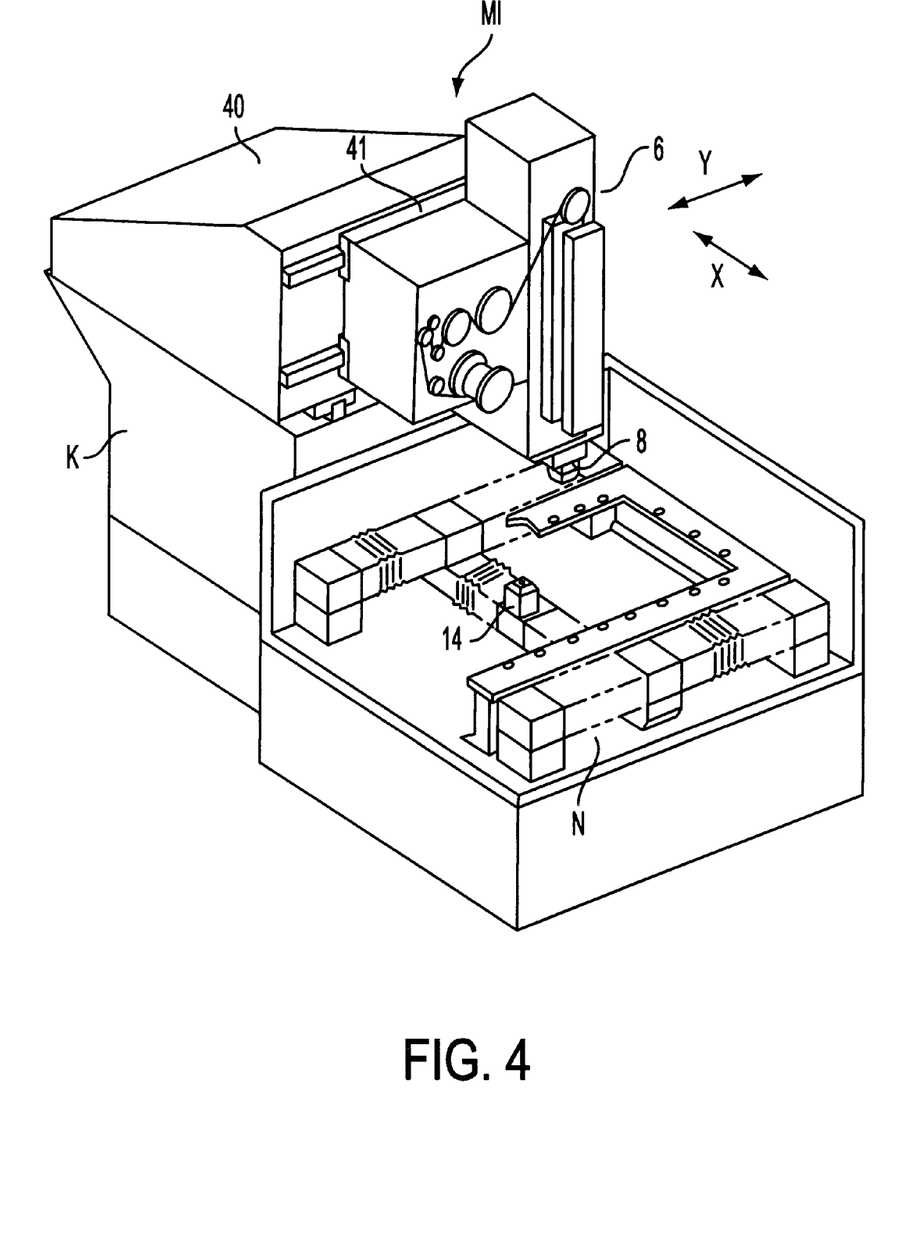
FIG. 4 is a perspective view showing a variation of the embodiment shown in FIG. 1.

Each of the motors 4, 7, 15D, 17D and 30D in the guide mechanism N and the movement mechanism M is connected to a positioning control unit U (although signal lines are not shown in the diagram); rotational control is exercised in accordance with the given machining data, and the upper wire guide device 8 and the lower wire guide device 14 move relative to the workpiece in the same manner as conventional devices to machine the workpiece by wire-cut electrical discharge. For normal straight-line machining, the workpiece is machined by maintaining the same coordinate positions for the lower wire guide device 14 as for the upper wire guide device 8, while traveling a specified machining path. For taper cut machining, different motions are used for the upper wire guide device 8 and the lower wire guide device 14, thus resulting in taper cut machining of the workpiece. In any case, the lower wire guide device 14 and the upper wire guide device 8 are caused to move relative to one another by the guide mechanism N and the movement mechanism M, thus making it possible to machine the workpiece to a desired shape. The embodiment of FIG. 1 is a configuration in which the movement mechanism M is supported by the work tank WT. However, as indicated in the embodiment of FIG. 4, a device comprising a moving body 40 corresponding to the beam part 3, and mounted so as to move freely in the X direction on an appropriate base K, and a moving body 41, mounted on this moving body 40 so as to move freely in the Y direction may be used. A movement mechanism M1 causes the first and second moving bodies 40 and 41 to move by means of a motor—not shown—and thus to move the machining head 6 which is affixed to moving body 41. The upper wire guide device 8 attached to the machining head 6 may also be constituted such that it is positioned within a specified X-Y (U-V) plane over the workpiece.

Figure 5:
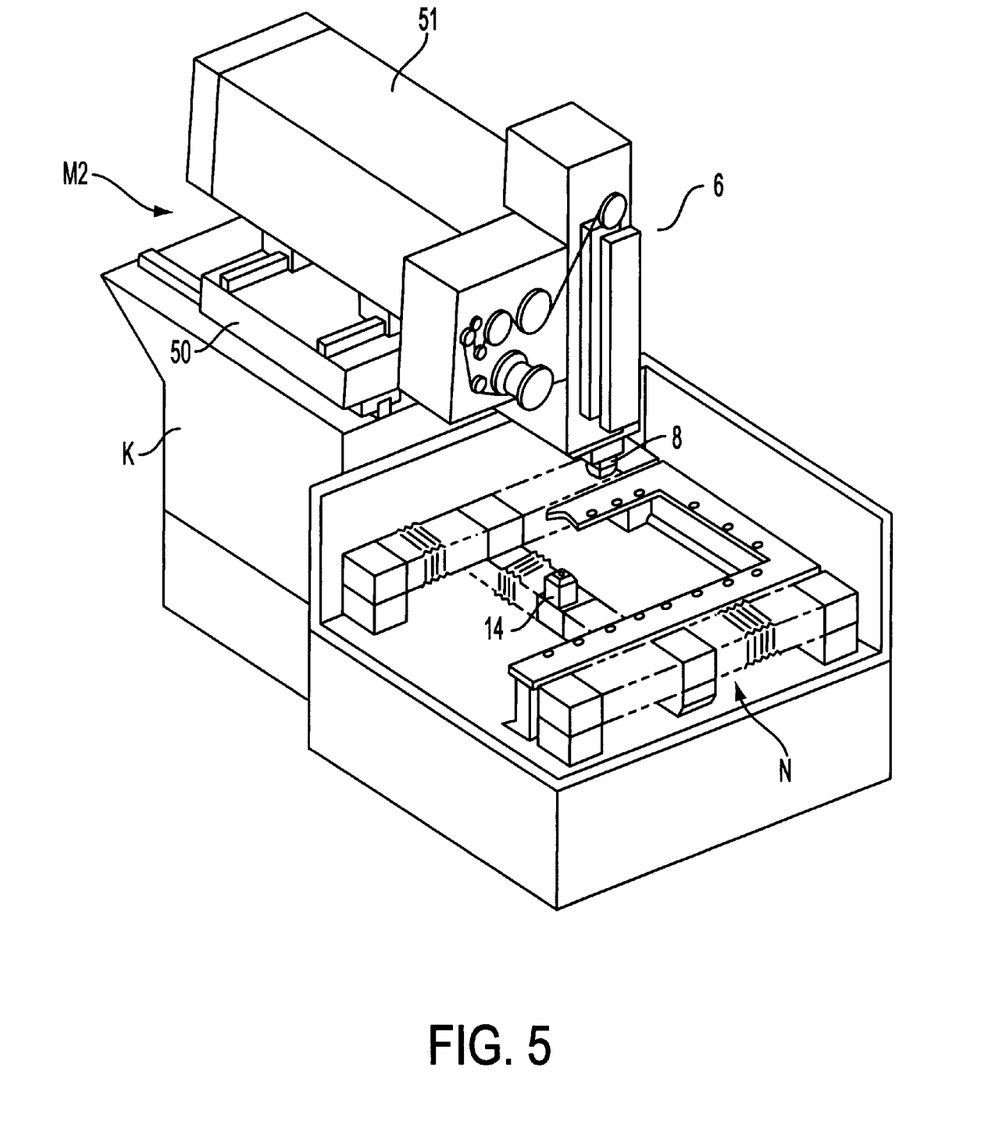
FIG. 5 is a perspective view showing another variation of the embodiment depicted in FIG. 1.

FIG. 5 depicts yet another variation of the movement mechanism M1 shown in FIG. 1. The movement mechanism M2 shown in FIG. 5 comprises a moving body 51, which is mounted so as to move freely in the Y direction on the upper portion of the moving body 50, which is mounted so as to be able to move freely in the X direction on the base K. In each of the embodiments explained above, the upper wire guide device 8 and lower wire guide device 14 is each capable of moving over a wide range by means of corresponding movement mechanisms, making possible the types of movements required for wide-angle tapering in the X-Y or U-V planes surrounding the workpiece.

Figure 7:
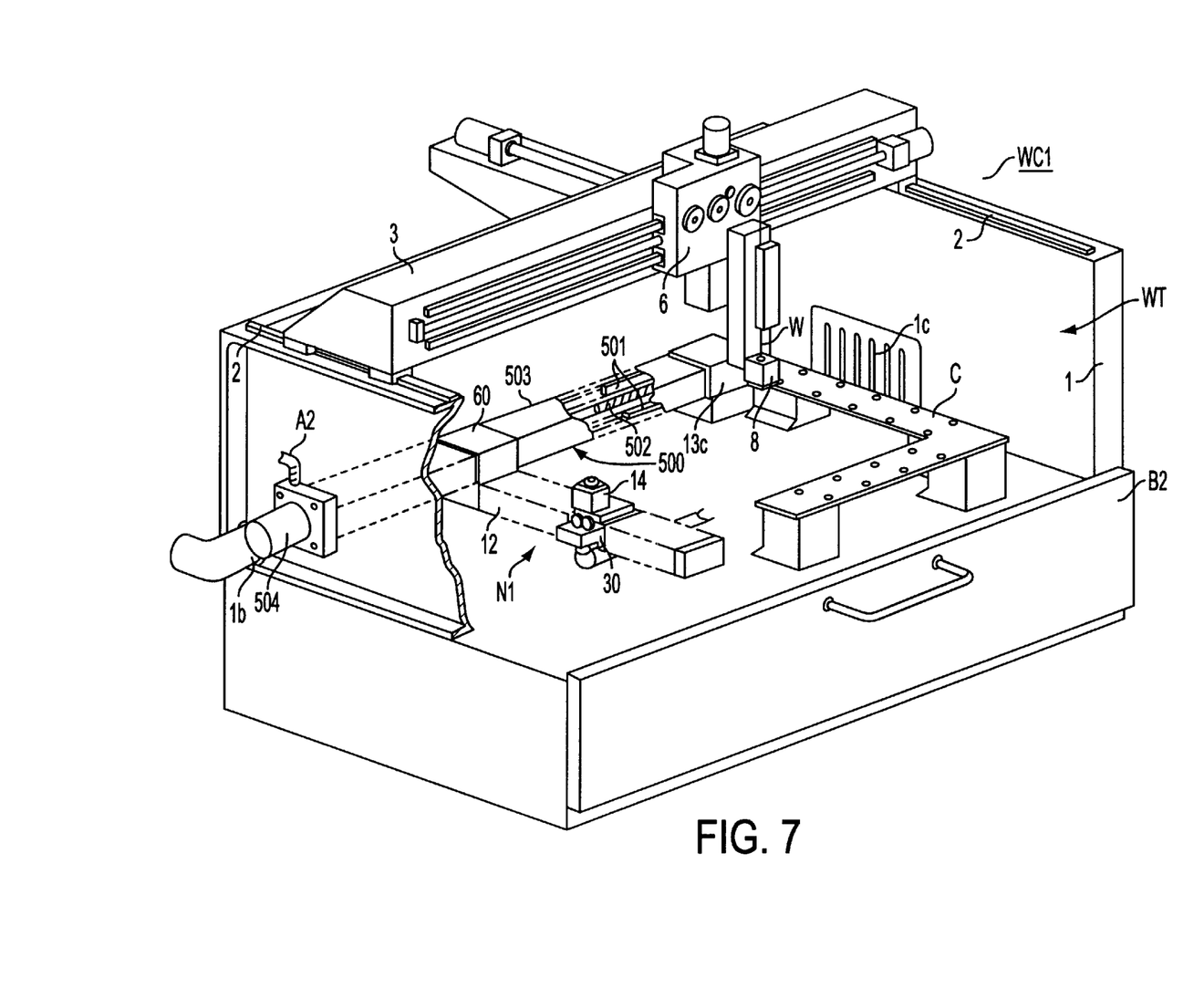
FIG. 7 is a perspective view showing a partial section of another embodiment of the present invention.

Another embodiment of the present invention is depicted in FIG. 7. For the wire-cut electrical discharge machine WC1 shown in FIG. 7, each of the structures explained in FIG. 1 is adopted as is, except the guide mechanism N1. Parts corresponding to those in FIG. 1 are therefore labeled with the same reference numerals, and an explanation thereof is omitted. The guide mechanism N1 for the wire-cut electrical discharge machine WC1 has a guide portion 500, one end of which is supported by the support post 13c; the pair of guide rails 501 and the feed screw 502 are sealed to the bellows 16 in a leak proof manner. A movable part 60 is connected to the guide rails 501 so as to be operable; one end of the movable guide 12 for guiding the lower wire guide motion device 30, to which the lower wire guide device 14 is attached, is affixed to the movable part 60. A motor 504 is provided for the purpose of rotationally driving the feed screw 502 mounted inside the guide 500 from the outside of the side wall 1 of the work tank WT.

Figure 8:
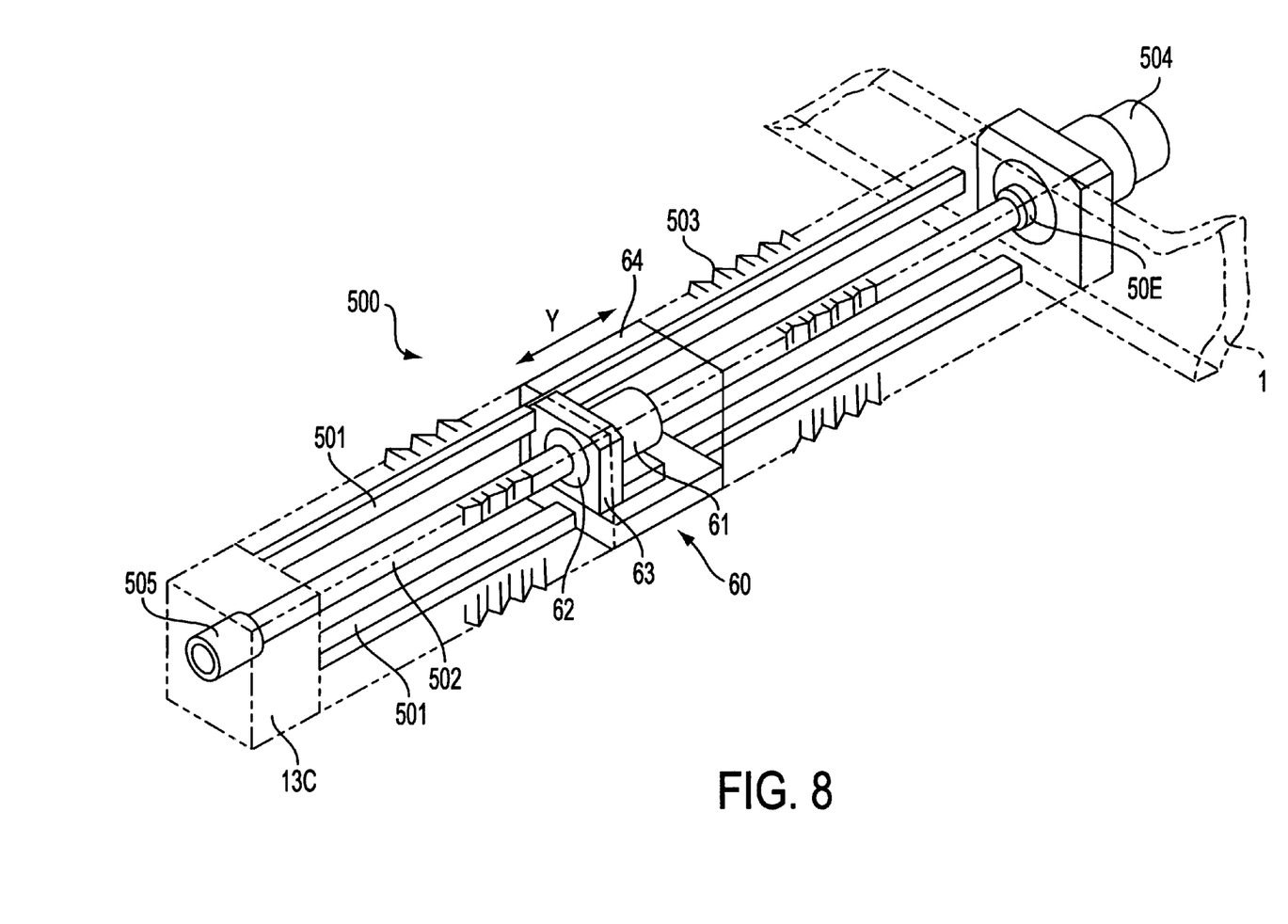
FIG. 8 is a perspective view showing a partial section of the structure of the guide depicted in FIG. 7.

Next we shall explain the structure of the guide 500, with reference to FIG. 8.

The feed screw 502 is rotatably supported by a bearing 505 within the support post 13c and linked to the rotating axle (not shown) of the motor 504. The movable part 60 includes a feed nut 61, which threadingly engages with the feed screw 502, a support part 63, which rotatably supports the feed nut through a bearing 62, and a casing 64 which contains these various parts. The support part 63 is guided by the guide rails 501, so that when the feed screw 502 rotates by virtue of the motor 504, the movable part 60 moves along the guide rails 501. The movement of the movable guide 12 in the Y direction by means of the movement of the moving part 60 is similar to the case of the embodiment of FIG. 1.

In FIG. 8, the pressurized fluid supply system linked by the pressurized fluid supply pipe A2 to the support post 13c is not shown, but in the embodiment of FIG. 7, a pressurized fluid supply system of the same type as that explained for FIG. 6 is provided for the same purpose.

Figure 9:
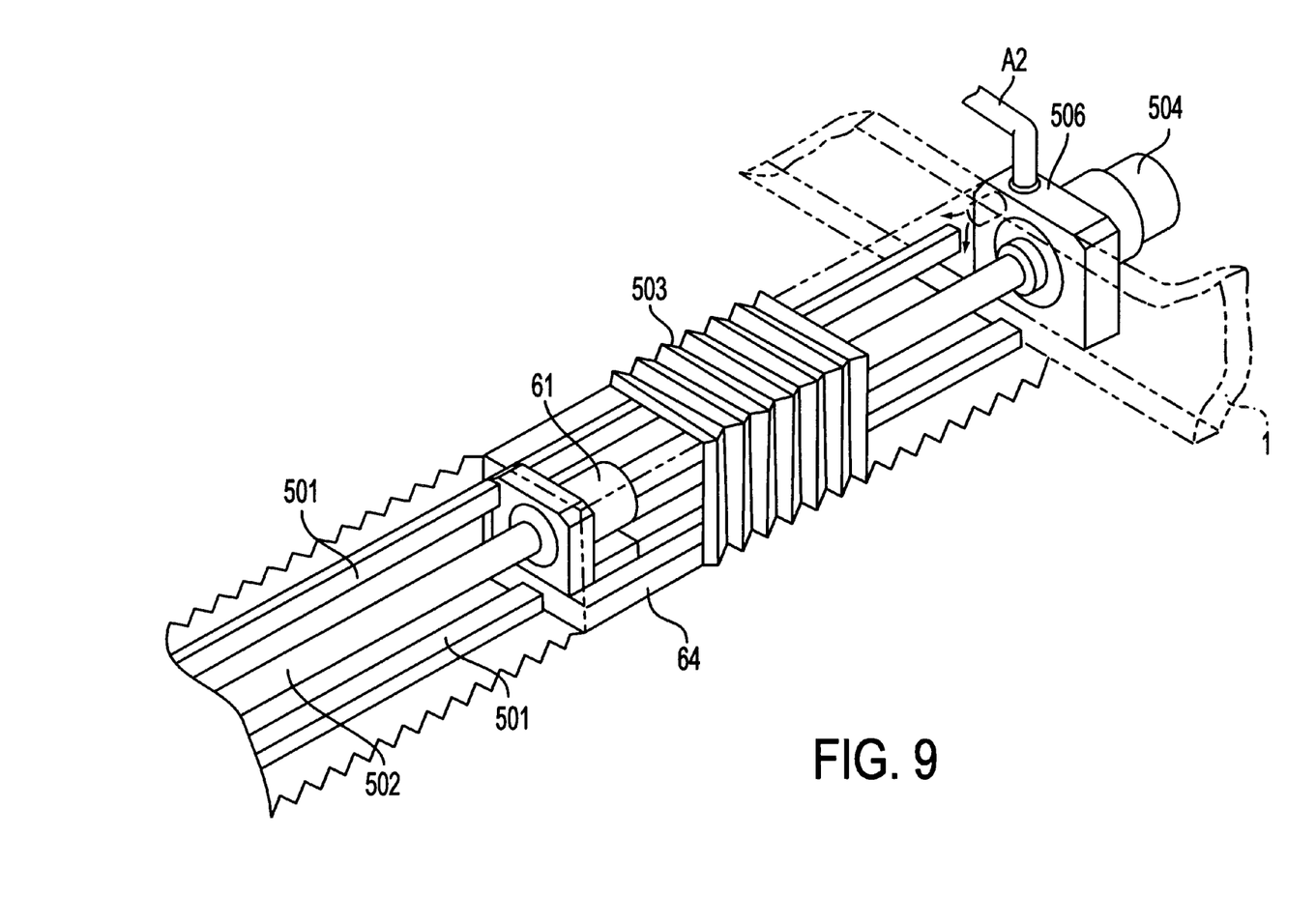
FIG. 9 is a perspective view showing a variation on the guide shown in FIG. 8.

In FIG. 9, an example is shown of the structure which supplies a pressurized fluid within the bellows 16 through the motor 504 mounting base 506 of the structure of FIG. 8. In this structure, the pressurized fluid supply pipe A2 is connected to the interior of the bellows 16 by connecting holes provided in the mounting base 506 and the work tank WT.

Figure 10:
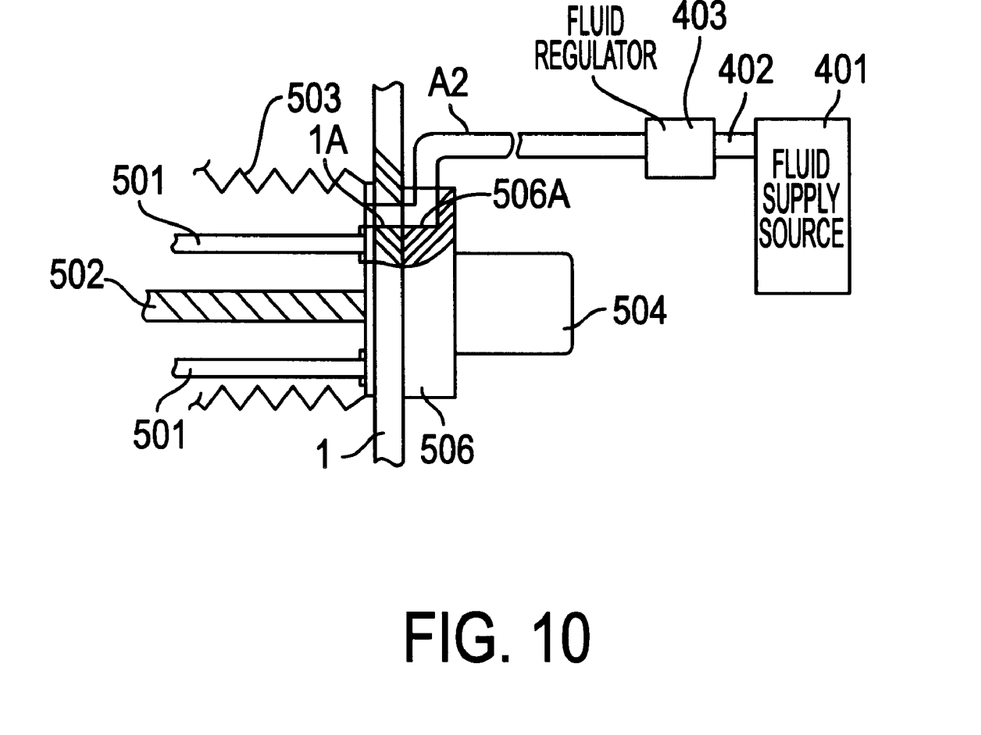
FIG. 10 is a diagram showing the main parts of the guide shown in FIG. 9, as well as the pressurized fluid supply system connected thereto.

A detail of this portion is shown in section in FIG. 10. As in FIG. 6, pressurized air from the pressure of the machining fluid supply source 401 is supplied to the pressurized fluid supply pipe A2 through a fluid pressure regulator 403. At the same time, a connecting hole 506A is formed on the mounting base 506, and a connecting hole 1A is formed on the side wall 1 of the work tank WT. These connecting holes 506A and 1A are connected using an appropriate sealing member such that there is no leakage of the pressurized fluid, and pressurized fluid supply pipe A2 is connected in an air-tight manner to the connecting hole 506A. Air, adjusted to a specified pressure, is therefore guided by the pressurized fluid supply pipe A2 and supplied to the inside of the bellows 16 through the connecting holes 506A and 1A. The method for and effects of adjusting the pressure when the pressurized fluid is supplied to the inside of the bellows 16 are the same as those of previously described embodiments.

As noted above, the wire-cut electrical discharge machine according to the present invention is not limited to the drawings disclosed for the embodiments, but of course also includes structures made up of numerous combinations thereof.

The present invention is not limited by the foregoing description of the preferred embodiments but is defined solely by the appended claims.

What is claimed is:

1. A wire-cut electrical discharge machine having a wire electrode tensioned between a first and a second wire guide for machining a workpiece by electrical discharge machining in a machining fluid which fills a gap formed between the wire electrode and the workpiece, said machine comprising:

a work tank containing the workpiece;

a guide mechanism positioned within the work tank for guiding the movement of the first wire guide in an X-Y plane formed by mutually perpendicular X and Y axes;

a first drive mechanism for driving the movement of the first wire guide along one of the axes, said first drive mechanism running along one of the X axis and Y axis;

a wire guide motion portion attached to the first wire guide;

a movable guide for guiding the movement along one of the axes of the wire guide motion portion;

a guide for guiding the movement of the movable guide along the other axis said movable guide including a pair of mutually parallel guide rails arrayed along one of the axes, a feed screw positioned parallel to the guide rails, a nut for engaging the feed screw so as to be movable along the feed screw, and a casing which holds the nut whereby said nut slides along the guide rails; and a sealing member for covering the guide mechanism to prevent leakage of the machining fluid therein.

2. A wire-cut electrical discharge machine having a wire electrode tensioned between a first and a second wire guide for machining a workpiece by electrical discharge machining in a machining fluid which fills a gap formed between the wire electrode and the said workpiece, said machine comprising:

a work tank containing the workpiece;

a guide mechanism positioned within the work tank for guiding the movement of the first wire guide in an X-Y plane formed by mutually perpendicular X and Y axes;

a first drive mechanism for driving the movement of the first wire guide along one of the axes, said first drive mechanism running along one of the X axis and Y axis;

a wire guide motion portion attached to the first wire guide;

a movable guide for guiding movement along one of the axes of the wire guide motion portion;

a guide for guiding the movement of the movable guide along the other axis;

a pair of mutually parallel guide rails arrayed along the other of the axes, a feed screw positioned parallel to the guide rails, a nut for movably engaging the feed screw, and a casing for holding the nut, whereby said casing slides along the guide rails; and a sealing member which covers the guide mechanism to prevent leakage of the machining fluid therein.

3. The wire cut electrical discharge machine according to claims 1 or 2, including a second drive means, arrayed outside of a side wall of the said work tank side wall, driving the movement of the movable guide along the guide.

4. The wire-cut electrical discharge machine according to claims 1 or 2, further comprising a second guide which guides the movement of the movable guide in opposition to the guide with respect to the first wire guide.

5. The wire-cut electrical discharge machine according to claim 4, including a third device means, which is attached to the second guide, for driving the movement of the movable guide.

6. The wire-cut electrical discharge machine according to claims 1 or 2, including a pressurized fluid supply means to supply pressurized fluid to the interior of the sealing member.

7. The wire-cut electrical discharge machine according to claim 6, wherein the pressurized fluid supply means includes a pressurized fluid supply path which connects the pressurized fluid supply source to the sealing member, a sensor provided on the sealing member for detecting the pressure of the machining fluid against the sealing member, and a fluid pressure regulator in the pressurized fluid supply path for controlling the pressure of the pressurized fluid in response to the output of the sensor.

8. A wire-cut electrical discharge machine for machining a workpiece by an electrical discharge using a wire electrode traveling between an upper wire guide and a lower wire guide, said upper and lower wire guides opposing each other from opposite sides of the workpiece, said machine comprising:

a stationary work tank for containing the workpiece, the workpiece being submerged in a machining fluid;

a first guide mechanism positioned inside the work tank for guiding the movement of the lower wire guide in a first horizontal plane;

a second guide mechanism positioned outside the work tank for guiding the movement of the upper wire guide in a second horizontal plane which is parallel to the first horizontal plane; and an essentially leak proof sealing member covering said first guide mechanism.

9. The wire-cut electrical discharge machine according to claim 8, wherein said first guide mechanism comprises a movable guide for guiding the movement of the lower wire guide in one of two orthogonal axes, and a stationary guide for guiding the movement of the moveable guide in the other of two orthogonal axes.

10. The wire-cut electrical discharge machine according to claim 9, wherein said movable guide includes a pair of parallel guide rails extending in said one of two orthogonal axes, a casing to which said lower wire guide is attached, said casing being slidable on the pair of guide rails, a feed screw positioned parallel to the pair of guide rails, a nut attached to the casing for threadingly engaging the feed screw; and wherein said machine further comprises a motor associated with the casing for rotating the nut.

11. The wire-cut electrical discharge machining according to claim 8, wherein said second guide mechanism comprises a movable guide for guiding the movement of the upper wire guide in one of two orthogonal axes, and a stationary guide for guiding the movement of the movable guide in the other of two orthogonal axes.

12. The wire-cut electrical discharge machine according to claim 11, wherein the stationary guide includes a pair of parallel guide rails, said guide rails being positioned above and extending essentially between opposite side walls of the work tank.

13. The wire-cut electrical discharge machine according to claim 8, further comprising a fluid supply means for supplying a pressurized fluid to the interior of the sealing member.

14. The wire-cut electrical discharge machine according to claim 13, wherein said fluid supply means includes a sensor for detecting the pressure of the machining fluid against the sealing member, and a fluid pressure regulator responsive to the sensor for controlling the pressure of the pressurized fluid.

* * * * *